US006635336B1

(12) United States Patent
Chen et al.

(10) Patent No.: US 6,635,336 B1
(45) Date of Patent: Oct. 21, 2003

(54) LUMINESCENT MOUSE PAD

(75) Inventors: Jen-Fu Chen, No. 835, Yuan Huan East Rd., Feng Yuan City, Taichung Hsien (TW); Chih-Shen Chen, Taichung (TW)

(73) Assignees: Jen-Fu Chen, Taichung Hisen (TW); Jason El Technology Co., Ltd., Taichung (TW)

( * ) Notice: Subject to any disclaimer, the term of this patent is extended or adjusted under 35 U.S.C. 154(b) by 21 days.

(21) Appl. No.: 10/081,377

(22) Filed: Feb. 21, 2002

(51) Int. Cl.[7] .................................................. B32B 3/10
(52) U.S. Cl. ........................... 428/195; 428/14; 428/76; 428/136; 428/203; 428/690; 248/346.01
(58) Field of Search .......................... 428/76, 136, 203, 428/195, 34.1, 14, 690; 248/346.01, 918

(56) References Cited

U.S. PATENT DOCUMENTS 6,368,693 B1 * 4/2002 Livingston et al. .... 248/346.01

* cited by examiner

Primary Examiner—Alexander S. Thomas

(74) Attorney, Agent, or Firm—Alan D. Kamrath; Rider Bennett LLP

(57) ABSTRACT

To achieve the above-mentioned and other objectives, the present invention provides a luminescent mouse pad including a substrate, a cover including a window defined therein and a frame around the window, and a luminescent laminate sandwiched between the substrate and the cover. Thus, light emitted from the luminescent laminate can be sprayed through the window. In an aspect, the window is printed with a pattern. The pattern is transparent. The substrate defines a recess for receiving a battery. The luminescent laminate includes two leads for contacting the battery. In another aspect, the luminescent mouse pad further includes a transparent decorative layer for insertion between the window and the luminescent laminate. The transparent decorative layer is printed with a pattern. The pattern is transparent. The substrate defines a slit through which the transparent decorative layer can be inserted into and removed from a pocket defined between substrate and the cover. The luminescent mouse pad further includes a driving device for driving the luminescent laminate. The driving device includes a terminal. The luminescent laminate includes a terminal for engagement with that of the driving device. The driving device includes a second terminal for connection with an external power supply. The driving device can drive the luminescent laminate to provide luminescence in various ways.

13 Claims, 5 Drawing Sheets

LUMINESCENT MOUSE PAD

BACKGROUND OF INVENTION

1. Field of Invention

The present invention is related to a mouse pad and, more particularly, to a luminescent mouse pad.

2. Related Prior Art

Today, a lot people use personal computers for various purposes. Almost every personal computer is equipped with a mouse in order to facilitate operation thereof. Generally, in use, a mouse is put on a mouse pad in order to provide proper friction between a track ball thereof and the mouse pad. This is a practice since proper friction on the track ball is critical for normal operation of the mouse. A mouse pad is put on a desk or table and is visible. As human nature, people do not only use things for practical purposes but also for decorative purposes. Therefore, the mouse pads are all printed with decorative patterns and some of the mouse pads are made with profiles for esthetic purposes. Conventionally, designs are limited to patterns and profiles. This is not satisfactory.

The present invention is therefore intended to provide a mouse pad more satisfactory than the above-mentioned conventional mouse pads regarding esthetics.

SUMMARY OF INVENTION

It is the primary objective of the present invention to provide a luminescent mouse pad.

To achieve the above-mentioned and other objectives, the present invention provides a luminescent mouse pad including a substrate, a cover including a window defined therein and a frame around the window, and a luminescent laminate sandwiched between the substrate and the cover. Thus, light emitted from the luminescent laminate can be sprayed through the window.

In an aspect, the window is printed with a pattern. The pattern is transparent. The substrate defines a recess for receiving a battery. The luminescent laminate includes two leads for contacting the battery.

In another aspect, the luminescent mouse pad further includes a transparent decorative layer for insertion between the window and the luminescent laminate. The transparent decorative layer is printed with a pattern. The pattern is transparent. The substrate defines a slit through which the transparent decorative layer can be inserted into and removed from a pocket defined between substrate and the cover.

The luminescent mouse pad further includes a driving device for driving the luminescent laminate. The driving device includes a terminal. The luminescent laminate includes a terminal for engagement with that of the driving device. The driving device includes a second terminal for connection with an external power supply. The driving device is capable of driving the luminescent laminate to provide luminescence in various ways.

BRIEF DESCRIPTION OF DRAWINGS

The present invention is described in detail via illustration of some preferred embodiments in the drawings wherein.

DETAILED DESCRIPTION OF PREFERRED EMBODIMENTS

Figure 1:
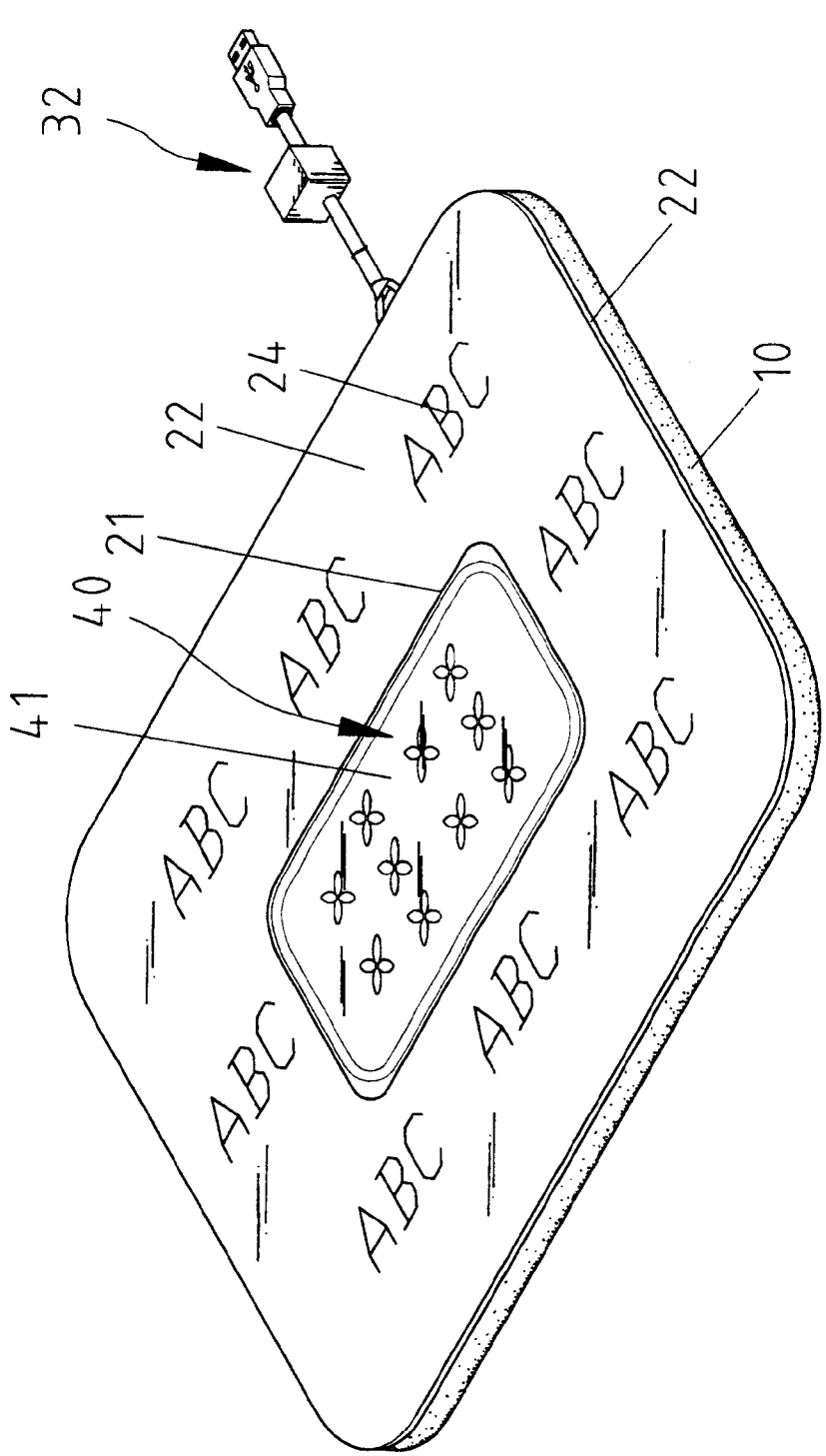
FIG. 1 is a perspective view of a luminescent mouse pad according to a first embodiment of the present invention.
Figure 2:
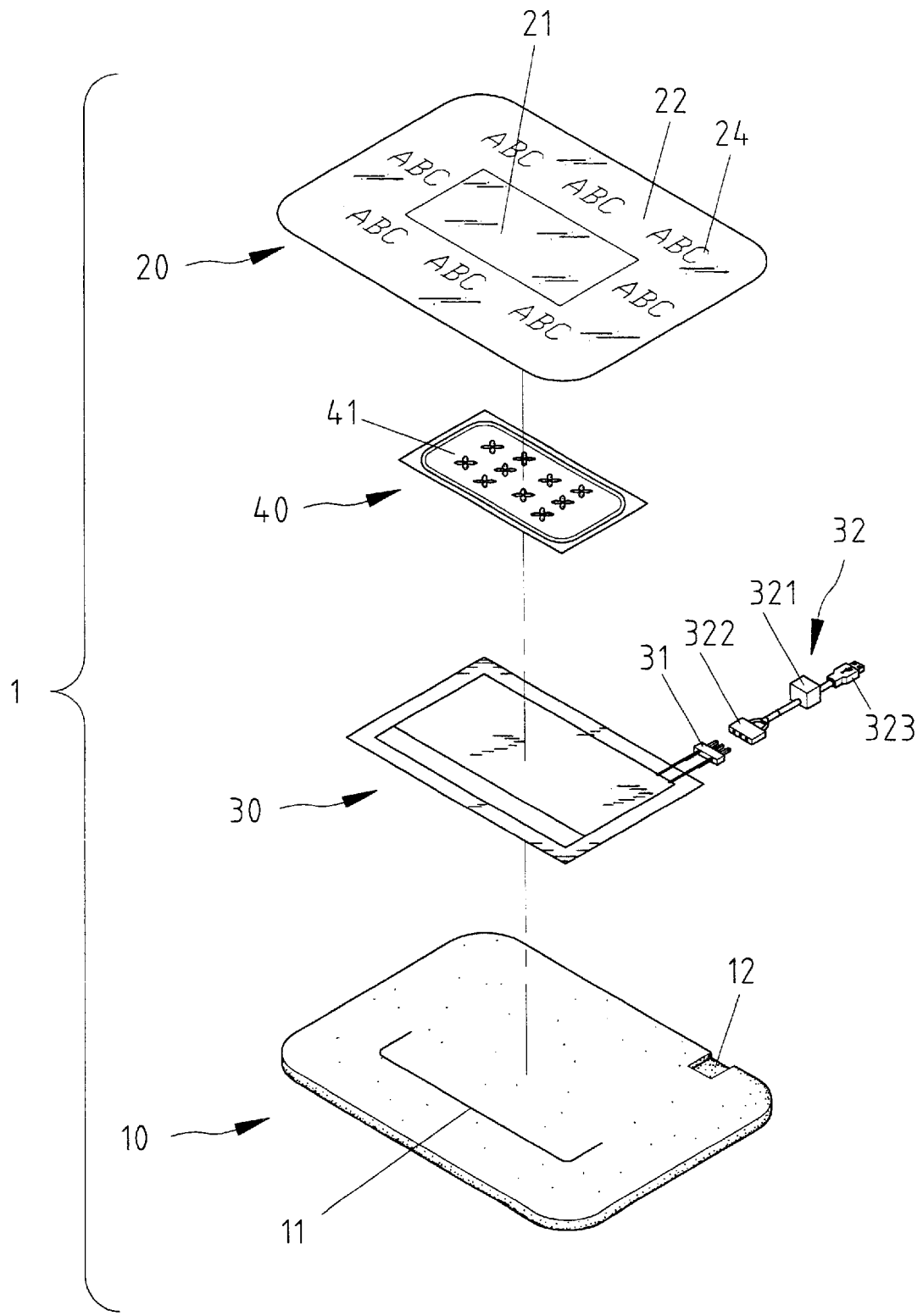
FIG. 2 is an exploded view of the luminescent mouse pad shown in FIG. 1.

Referring to FIGS. 1 and 2, according to a first embodiment of the present invention, a luminescent mouse pad 1 includes a substrate 10. A slit 11 is defined in the substrate 10 so that the slit 11 extends through the thickness of the substrate 10. A recess 12 is defined in an edge of the substrate 10.

A luminescent laminate 30 includes a plug 31 for transferring electricity thereto. The luminescent laminate 30 is attached to the upside of the substrate 10. The plug 31 is received in the recess 12. The luminescent laminate 30 should leave the slit 11 open.

A cover 20 includes a transparent window 21 in the center thereof and an opaque frame 22 around the window 21. The frame 22 is printed with a pattern 24. The cover 20 is adhered to the substrate 10 along their edges, thus defining a pocket (not numbered) between them. The window 21 is position above the luminescent laminate 30 so that light emitted from the latter can be sprayed through the former.

Figure 4:
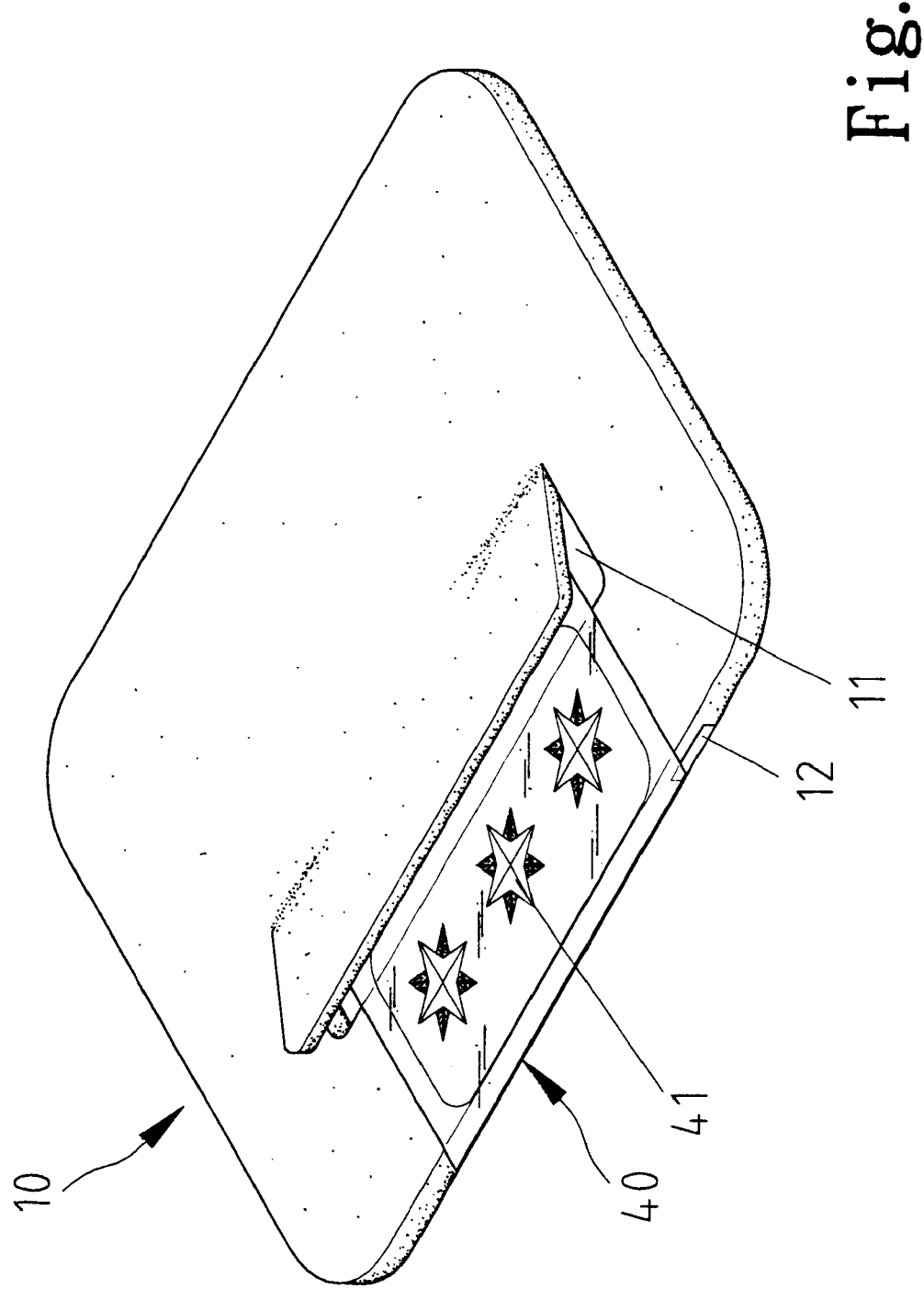
FIG. 4 shows the underside of the luminescent mouse pad of FIG. 1.

A transparent decorative layer 40 is printed with a pattern 41. As best seen in FIG. 4, through the slit 11, the transparent decorative layer 40 can be inserted into the pocket defined between the substrate 10 and the cover 20. In use, the transparent decorative layer 40 is sandwiched between the luminescent laminate 30 and the window 21 so that light emitted from the luminescent laminate 30 can be sprayed through the transparent decorative layer 40 and the window 21. Obviously, through the slit 11, the transparent decorative layer 40 can be removed from the pocket defined between the substrate 10 and the cover 20. Thus, more than one transparent decorative layer may be used, and any of them may be inserted into the pocket defined between the substrate 10 and the cover 20 as it pleases the user.

Figure 3:
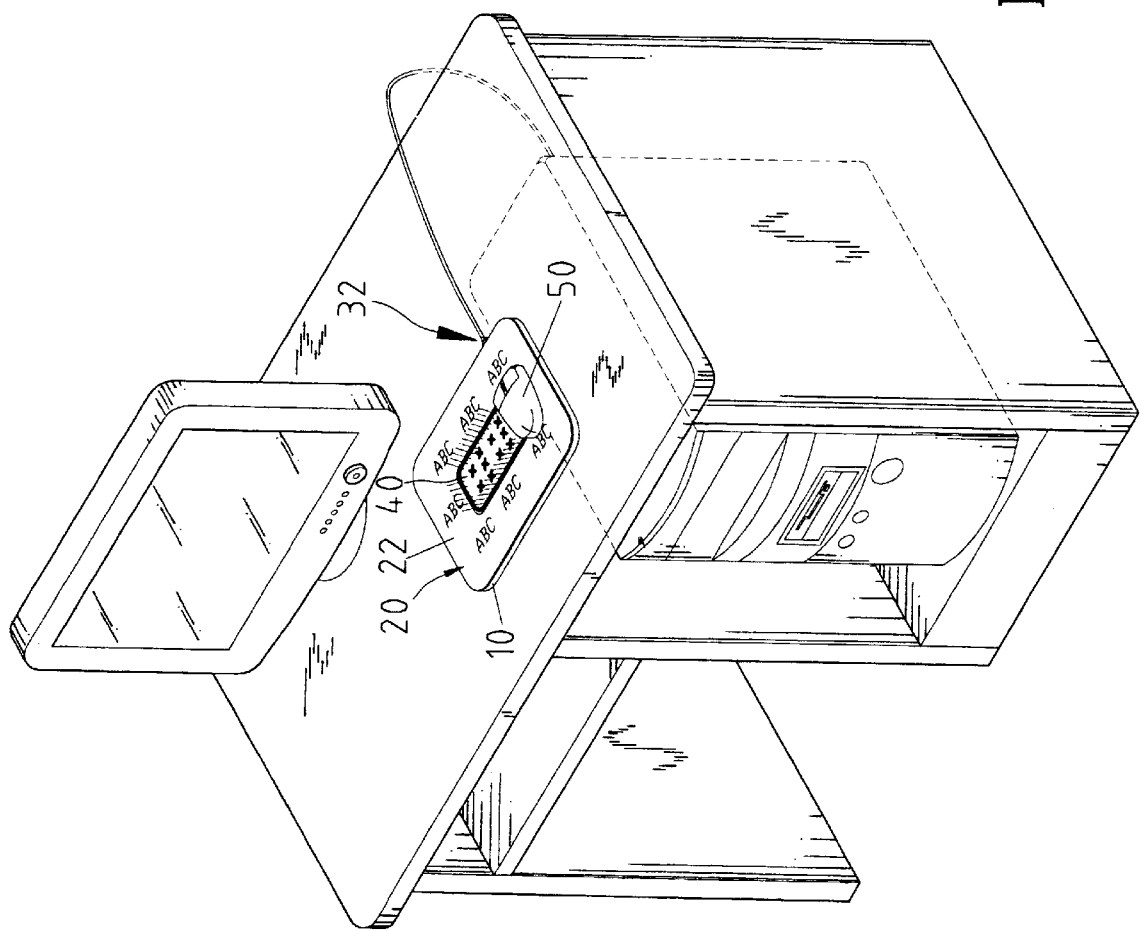
FIG. 3 is a perspective view of the luminescent mouse pad of FIG. 1 connected with a personal computer through a powering device.

Referring to FIG. 2, a driving device 32 includes a programmable control unit 321 with which a socket 322 and a plug 323 are connected. The socket 322 can be engaged with the plug 31. Referring to FIG. 3, the plug 323 can be engaged with a socket (not shown) of a personal computer, thus permitting power from the personal computer to the luminescent laminate 30 through the driving device 32. The programmable control unit 321 can be programmed so as to drive the luminescent laminate 30 to provide luminescence in various ways. A mouse 50 is put on the luminescent mouse pad 1.

Figure 5:
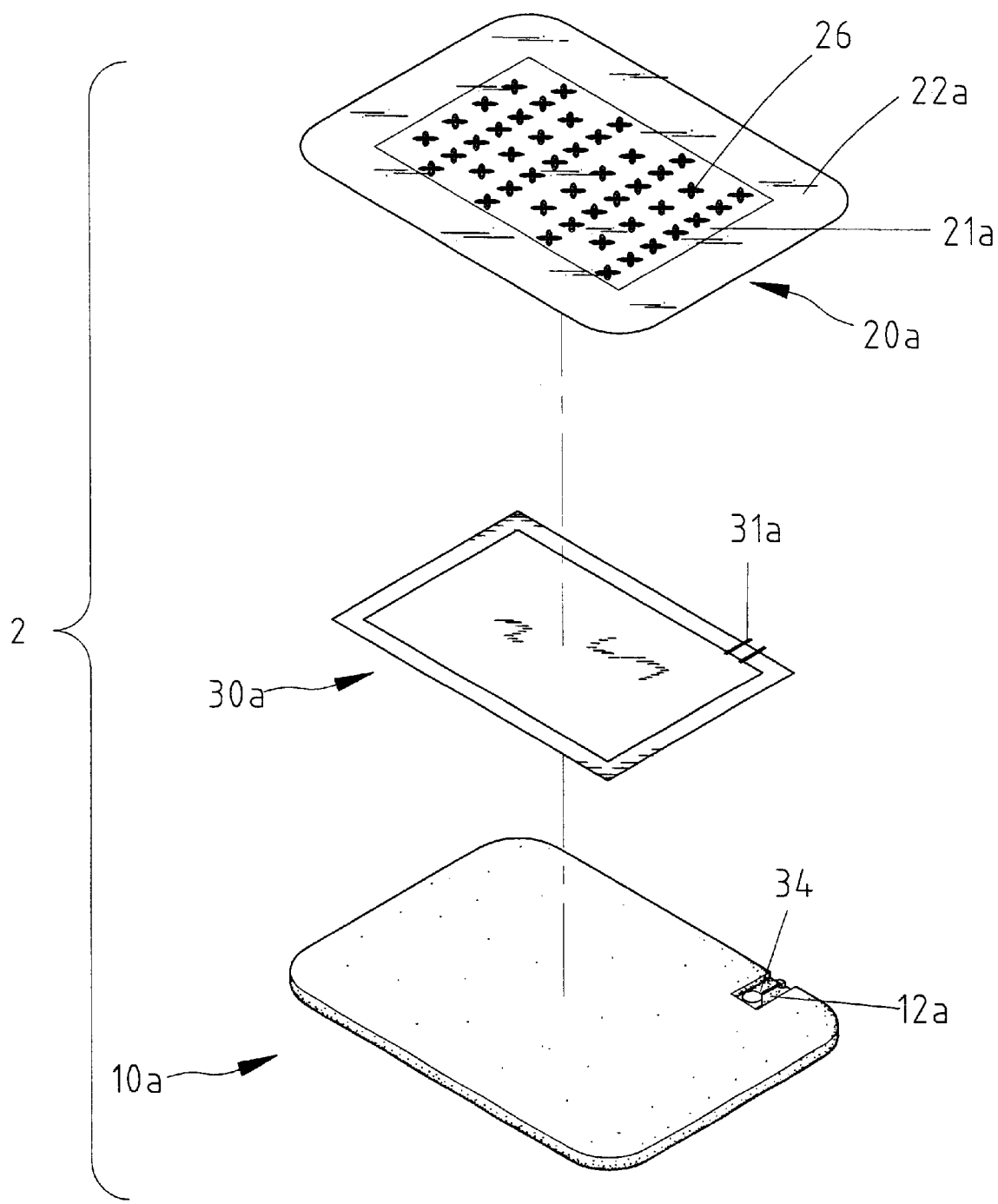
FIG. 5 is an exploded view of a luminescent mouse pad according to a second embodiment of the present invention.

FIG. 5 shows a luminescent mouse pad 2 according to a second embodiment of the present invention. It includes a substrate 10a, a cover 20a, and a luminescent laminate 30a. The substrate 10a defines a recess 12a for receiving a battery 34. The cover 20a includes a transparent window 21a at the center and an opaque frame 22a around the window 21a. A transparent decorative pattern 26 is printed on the window 21a. The luminescent laminate 30a includes two leads 31a. The luminescent laminate 30a is sandwiched between the substrate 10a and the cover 20a. The leads 31a contact the battery 34, thus permitting power from the battery 34 to the luminescent laminate 30a. The window 21a is above the luminescent laminate 30 so that light emitted from the latter can be sprayed through the former.

A number of embodiments of the present invention have been described in detail for purposes of illustration. Those skilled in the art can derive a lot of variations from these embodiments after a study of this patent specification. Therefore, these embodiments shall by no means limit the scope of the present invention. The scope of the present invention can only be defined in the following claims attached to and taken as a portion of this patent specification.

What is claimed is:

1. A luminescent mouse pad including:
   a substrate (10; 10*a*);
   a cover (20; 20*a*) including a window (21; 21*a*) defined therein and a frame (22; 22*a*) around the window (21; 21*a*); and
   a luminescent laminate (30; 30*a*) sandwiched between the substrate (10; 10*a*) and the cover (20; 20*a*) so that light emitted from the luminescent laminate (30; 30*a*) can be sprayed through the window (21; 21*a*).

2. The luminescent mouse pad as set forth in claim 1 wherein the window (21*a*) is printed with a pattern (26).

3. The luminescent mouse pad as set forth in claim 2 wherein the pattern (26) is transparent.

4. The luminescent mouse pad as set forth in claim 1 wherein the substrate (10*a*) defines a recess (12*a*) for receiving a battery (34), and the luminescent laminate (30) includes two leads (31*a*) for contacting the battery (34).

5. The luminescent mouse pad as set forth in claim 1 including a transparent decorative layer (40) for insertion between the window (21) and the luminescent laminate (30).

6. The luminescent mouse pad as set forth in claim 5 wherein the transparent decorative layer (40) is printed with a pattern (41).

7. The luminescent mouse pad as set forth in claim 6 wherein the pattern (41) is transparent.

8. The luminescent mouse pad as set forth in claim 5 wherein the substrate (10) defines a slit (11) through which the transparent decorative layer (40) can be inserted into and removed from a pocket defined between substrate (10) and the cover (20).

9. The luminescent mouse pad as set forth in claim 1 including a driving device (32) for driving the luminescent laminate (30).

10. The luminescent mouse pad as set forth in claim 9 wherein the driving device (32) includes a terminal (322), and the luminescent laminate (30) includes a terminal (31) for engagement with that (322) of the driving device (32).

11. The luminescent mouse pad as set forth in claim 9 wherein the driving device (32) includes a second terminal (323) for connection with an external power supply.

12. The luminescent mouse pad as set forth in claim 9 wherein the driving device (32) is capable of driving the luminescent laminate (30) to provide luminescence in various ways.

13. The luminescent mouse pad as set forth in claim 1 wherein the frame (22) is printed with a pattern (24).

* * * * *